(12) United States Patent
Tang et al.

(10) Patent No.: US 8,331,036 B2
(45) Date of Patent: Dec. 11, 2012

(54) IMAGING LENS SYSTEM

(75) Inventors: Hsiang Chi Tang, Taichung (TW);
Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 149 days.

(21) Appl. No.: 12/854,593

(22) Filed: Aug. 11, 2010

(65) Prior Publication Data

US 2011/0194013 A1   Aug. 11, 2011

(30) Foreign Application Priority Data

Feb. 9, 2010   (TW) ................................ 99104028 A

(51) Int. Cl.
*G02B 9/12* (2006.01)
*G02B 3/02* (2006.01)

(52) U.S. Cl. ........................................ 359/716; 359/784

(58) Field of Classification Search .......... 359/715–716, 359/781, 761, 753, 784, 791, 768–769, 779, 359/760

See application file for complete search history.

(56) References Cited

U.S. PATENT DOCUMENTS

| | | | | |
|---|---|---|---|---|
| 6,985,307 | B2 * | 1/2006 | Do ................................ | 359/716 |
| 7,046,460 | B2 * | 5/2006 | Nozawa ........................ | 359/791 |
| 7,529,041 | B2 | 5/2009 | Huang et al. | |
| 7,848,032 | B1 * | 12/2010 | Chen et al. .................... | 359/715 |
| 2008/0266678 | A1 * | 10/2008 | Tang ............................. | 359/781 |
| 2011/0069378 | A1 * | 3/2011 | Lin et al. ....................... | 359/356 |

\* cited by examiner

*Primary Examiner* — Ricky Mack
*Assistant Examiner* — Zachary Wilkes
(74) *Attorney, Agent, or Firm* — Morris, Manning & Martin, LLP; Tim Tingkang Xia, Esq.

(57) ABSTRACT

This invention provides an imaging lens system in order from an object side to an image side including a first lens element having a convex object-side surface and a concave image-side surface, a second lens element with positive refractive power having its object-side and image-side surfaces being aspheric, a third lens element with negative refractive power having its object-side and image-side surfaces being aspheric and at least one inflection point formed on one of the two surfaces, and an aperture stop disposed between the first lens element and the second lens element. There are three lens elements with refractive power in this system.

24 Claims, 17 Drawing Sheets

| TABLE 1 | | | | | | |
|---|---|---|---|---|---|---|
| (Embodiment 1) | | | | | | |
| f = 2.17 mm, Fno = 2.85, HFOV = 37.5 deg. | | | | | | |
| Surface # | | Curvature Radius | Thickness | Material | Index | Abbe # | Focal length |
| 0 | Object | Plano | Infinity | | | | |
| 1 | Lens 1 | 1.12149 (ASP) | 0.495 | Plastic | 1.632 | 23.4 | -27.62 |
| 2 | | 0.87366 (ASP) | 0.149 | | | | |
| 3 | Ape. Stop | Plano | 0.057 | | | | |
| 4 | Lens 2 | 31.50410 (ASP) | 0.725 | Plastic | 1.544 | 55.9 | 1.02 |
| 5 | | -0.55845 (ASP) | 0.200 | | | | |
| 6 | Lens 3 | -0.38229 (ASP) | 0.446 | Plastic | 1.583 | 32.0 | -5.26 |
| 7 | | -0.62443 (ASP) | 0.200 | | | | |
| 8 | IR-Filter | Plano | 0.300 | Glass | 1.517 | 64.2 | - |
| 9 | | Plano | 0.500 | | | | |
| 10 | Cover-glass | Plano | 0.400 | Glass | 1.517 | 64.2 | - |
| 11 | | Plano | 0.484 | | | | |
| 12 | Image | Plano | | | | | |

Fig.9

| TABLE 2 | | | |
|---|---|---|---|
| Surface # | 1 | 2 | 4 |
| k = | 1.00000E+00 | -4.24381E-01 | -1.50000E+02 |
| A4 = | -2.08077E-02 | 6.50950E-01 | -4.94152E-01 |
| A6 = | 3.37392E-01 | 1.66750E+00 | 6.95002E+00 |
| A8 = | -9.57055E-01 | -4.14349E+00 | -9.25019E+01 |
| A10= | 1.13828E+00 | 1.15596E+02 | 3.67238E+02 |
| A12= | 3.88137E-01 | -2.77076E-06 | 1.27962E+03 |
| A14= | | | -8.59762E+03 |
| Surface # | 5 | 6 | 7 |
| k = | -6.31310E-01 | -8.33230E-01 | -8.24618E-01 |
| A4 = | -1.12842E-02 | 3.79080E-01 | 1.06933E-01 |
| A6 = | -2.08051E-01 | 3.29863E+00 | 4.50655E-01 |
| A8 = | 9.57839E-01 | -2.18142E+00 | 3.68735E-01 |
| A10= | -3.21032E+00 | 6.60178E-01 | -5.98351E-01 |
| A12= | 1.97407E+00 | -6.13415E+00 | 3.80912E-03 |
| A14= | -8.51791E-06 | 8.33506E+00 | 1.86714E-01 |

Fig.10

| TABLE 3 | | | | | | |
|---|---|---|---|---|---|---|
| (Embodiment 2) | | | | | | |
| f = 2.34 mm, Fno = 2.80, HFOV = 31.7 deg. | | | | | | |
| Surface # | | Curvature Radius | Thickness | Material | Index | Abbe # | Focal length |
| 0 | Object | Plano | Infinity | | | | |
| 1 | Lens 1 | 1.22320 (ASP) | 0.666 | Plastic | 1.543 | 56.5 | 5.21 |
| 2 | | 1.73966 (ASP) | 0.202 | | | | |
| 3 | Ape. Stop | Plano | 0.354 | | | | |
| 4 | Lens 2 | -1.35718 (ASP) | 0.628 | Plastic | 1.543 | 56.5 | 1.47 |
| 5 | | -0.58559 (ASP) | 0.050 | | | | |
| 6 | Lens 3 | 2.72641 (ASP) | 0.350 | Plastic | 1.543 | 56.5 | -2.87 |
| 7 | | 0.94749 (ASP) | 0.300 | | | | |
| 8 | IR-Filter | Plano | 0.300 | Glass | 1.517 | 64.2 | - |
| 9 | | Plano | 0.100 | | | | |
| 10 | Cover-glass | Plano | 0.400 | Glass | 1.517 | 64.2 | - |
| 11 | | Plano | 0.405 | | | | |
| 12 | Image | Plano | | | | | |

Fig.11

| TABLE 4 | | | |
|---|---|---|---|
| Surface # | 1 | 2 | 4 |
| k = | 1.13128E+00 | -1.00000E+00 | -2.28947E+00 |
| A4 = | 5.32821E-03 | 4.14348E-01 | -1.83374E-01 |
| A6 = | 4.06033E-02 | 1.26792E+00 | -8.77779E-01 |
| A8 = | -9.07338E-02 | -5.14464E+00 | 3.61890E+00 |
| A10= | 1.27067E-01 | 2.88393E+01 | 9.54396E+00 |
| A12= | | | -1.94985E+01 |
| Surface # | 5 | 6 | 7 |
| k = | -3.49629E+00 | -1.00000E+00 | -9.88826E+00 |
| A4 = | -1.03759E+00 | -3.57339E-01 | -2.49846E-01 |
| A6 = | 1.93263E+00 | 3.26456E-01 | 1.89548E-01 |
| A8 = | -4.13796E+00 | -1.00861E-01 | -1.29679E-01 |
| A10= | 4.57477E+00 | -4.71305E-03 | 6.16497E-02 |
| A12= | | -2.17591E-03 | -1.26865E-02 |
| A14= | | | -1.99240E-03 |

Fig.12

| TABLE 5 | | | | | | | |
|---|---|---|---|---|---|---|---|
| (Embodiment 3) | | | | | | | |
| f = 2.53 mm, Fno = 3.00, HFOV = 30.0 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | 0.000 | | | | |
| 2 | Lens 1 | 1.40470 (ASP) | 0.319 | Plastic | 1.544 | 55.9 | 6.14 |
| 3 | | 2.22885 (ASP) | 0.295 | | | | |
| 4 | Lens 2 | -1.73243 (ASP) | 0.380 | Plastic | 1.544 | 55.9 | 3.52 |
| 5 | | -0.97988 (ASP) | 0.050 | | | | |
| 6 | Lens 3 | 0.80672 (ASP) | 0.280 | Plastic | 1.530 | 55.8 | -17.88 |
| 7 | | 0.65406 (ASP) | 1.000 | | | | |
| 8 | IR-Filter | Plano | 0.300 | Glass | 1.517 | 64.2 | - |
| 9 | | Plano | 0.576 | | | | |
| 10 | Image | Plano | | | | | |

Fig.13

| TABLE 6 | | | |
|---|---|---|---|
| Surface # | 2 | 3 | 4 |
| k = | -2.98357E+00 | -7.34221E+00 | -2.02227E+01 |
| A4 = | -8.26844E-02 | -1.15738E-01 | 1.53666E-01 |
| A6 = | -7.46840E-01 | -1.60501E+00 | -1.25481E+00 |
| A8 = | -2.40580E-01 | 3.15616E+00 | 2.35130E+00 |
| A10= | 5.01865E+00 | -8.71632E+00 | 1.76856E+00 |
| A12= | -2.12014E+01 | 9.73060E+00 | -2.37554E+00 |
| Surface # | 5 | 6 | 7 |
| k = | -5.53296E+00 | -1.84594E+00 | -2.38008E+00 |
| A4 = | -3.53444E-01 | -5.65217E-01 | -4.08696E-01 |
| A6 = | 3.93483E-01 | 2.37617E-01 | 2.94657E-01 |
| A8 = | 1.35163E-01 | 1.92549E-01 | -1.61944E-01 |
| A10= | 8.02933E-01 | -2.64794E-01 | 6.98292E-02 |
| A12= | 1.57869E+00 | 7.03380E-02 | -3.23003E-02 |

Fig.14

| TABLE 7 | | | | | | |
|---|---|---|---|---|---|---|
| (Embodiment 4) | | | | | | |
| f = 2.39 mm, Fno = 2.85, HFOV = 35.0 deg. | | | | | | |
| Surface # | | Curvature Radius | Thickness | Material | Index | Abbe # | Focal length |
| 0 | Object | Plano | Infinity | | | | |
| 1 | Lens 1 | 1.16399 (ASP) | 0.361 | Plastic | 1.632 | 23.4 | -9.53 |
| 2 | | 0.85830 (ASP) | 0.153 | | | | |
| 3 | Ape. Stop | Plano | 0.046 | | | | |
| 4 | Lens 2 | 4.31070 (ASP) | 0.681 | Plastic | 1.544 | 55.9 | 1.21 |
| 5 | | -0.73245 (ASP) | 0.352 | | | | |
| 6 | Lens 3 | -0.43177 (ASP) | 0.445 | Plastic | 1.583 | 30.2 | -7.58 |
| 7 | | -0.66021 (ASP) | 0.500 | | | | |
| 8 | IR-Filter | Plano | 0.300 | Glass | 1.517 | 64.2 | - |
| 9 | | Plano | 0.300 | | | | |
| 10 | Cover-glass | Plano | 0.400 | Glass | 1.517 | 64.2 | - |
| 11 | | Plano | 0.466 | | | | |
| 12 | Image | Plano | | | | | |

Fig.15

| TABLE 8 | | | |
|---|---|---|---|
| Surface # | 1 | 2 | 4 |
| k = | 3.73747E-01 | -1.46512E+00 | -1.00000E+00 |
| A4 = | -2.13626E-02 | 3.72672E-01 | -4.58658E-01 |
| A6 = | -8.23915E-03 | 2.98871E+00 | 4.01321E+00 |
| A8 = | -1.47717E-02 | -2.08299E+01 | -3.23200E+01 |
| A10= | 7.83296E-02 | 1.02448E+02 | -3.44611E+01 |
| A12= | 6.38404E-01 | 6.33049E-04 | 1.27962E+03 |
| A14= | | | -3.49751E+03 |
| Surface # | 5 | 6 | 7 |
| k = | -5.36958E-01 | -8.15225E-01 | -8.10949E-01 |
| A4 = | -1.92436E-01 | -9.65704E-02 | 7.60823E-02 |
| A6 = | -7.91932E-01 | 3.41282E+00 | 3.10863E-01 |
| A8 = | 2.74825E+00 | -1.94086E+00 | 9.48533E-01 |
| A10= | -7.55684E+00 | 1.14518E+00 | -8.03786E-01 |
| A12= | 8.04100E+00 | -7.48481E+00 | -6.91393E-01 |
| A14= | -3.29258E-02 | 8.48485E+00 | 7.40057E-01 |

Fig.16

| TABLE 9 | | | | |
|---|---|---|---|---|
| | Embodiment 1 | Embodiment 2 | Embodiment 3 | Embodiment 4 |
| f | 2.17 | 2.34 | 2.53 | 2.39 |
| Fno | 2.85 | 2.80 | 3.00 | 2.85 |
| HFOV | 37.5 | 31.7 | 30.0 | 35.0 |
| V2−V1 | 32.5 | 0.0 | 0.0 | 32.5 |
| CT2 [mm] | 0.73 | 0.63 | 0.38 | 0.68 |
| (T23/f)*100 | 9.2 | 2.1 | 2.0 | 14.7 |
| R1/f | 0.52 | 0.52 | 0.56 | 0.49 |
| R2/f | 0.40 | 0.74 | 0.88 | 0.36 |
| R6/f3 | 0.12 | −0.33 | −0.04 | 0.09 |
| |R3/R4| | 56.41 | 2.32 | 1.77 | 5.89 |
| R5/R6 | 0.61 | 2.88 | 1.23 | 0.65 |
| |f/f1| | 0.08 | 0.45 | 0.41 | 0.25 |
| f/f2 | 2.13 | 1.59 | 0.72 | 1.98 |
| f/f3 | −0.41 | −0.82 | −0.14 | −0.32 |
| TTL/ImgH | 2.22 | 2.46 | 2.15 | 2.24 |

Fig.17

IMAGING LENS SYSTEM

CROSS-REFERENCE TO RELATED APPLICATIONS

This non-provisional application claims priority under 35 U.S.C. §119(a) on Patent Application No(s). 099104028 filed in Taiwan, R.O.C. on Feb. 9, 2010, the entire contents of which are hereby incorporated by reference.

BACKGROUND OF THE INVENTION

1. Field of the Invention

The present invention relates to an imaging lens system, and more particularly, to an optical system used in a compact imaging module.

2. Description of the Prior Art

In recent years, with the popularity of imaging modules, the demand for compact photographing lens assemblies is increasing, and the sensor of a general photographing lens assembly is none other than CCD (charge coupled device) or CMOS (Complementary Metal Oxide Semiconductor). Furthermore, as advanced semiconductor manufacturing technology has allowed the pixel size of sensors to be reduced and electronic products have become more compact and powerful, there is an increasing demand for compact imaging lens assemblies featuring better image quality.

In order to correct aberrations, a conventional imaging lens system, such as the optical lens system for taking image disclosed in U.S. Pat. No. 7,529,041, generally adopts the so-called triplet design and comprises, in order from the object side to the image side: a first lens element with positive refractive power; a second lens element with negative refractive power; and a third lens element with positive refractive power. Both surfaces of the first lens element are convex and this enables an effective reduction of the total track length of the system. However, such an arrangement may render the refractive power of the first lens element excessive and cause the system to generate more aberrations that affect the image quality. Moreover, the proportions of the refractive power contributed by the second and third lens elements have to be increased to balance the refractive power of the first lens element. Consequently, the sensitivity of the system will be increased, making it more difficult to control the manufacturing yields of the imaging lens system.

SUMMARY OF THE INVENTION

The present invention provides an imaging lens system comprising, in order from an object side to an image side: a first lens element having a convex object-side surface and a concave image-side surface; a second lens element with positive refractive power, the object-side and image-side surfaces thereof being aspheric; a third lens element with negative refractive power, the object-side and image-side surfaces thereof being aspheric and at least one of which being provided with at least one inflection point; and an aperture stop disposed between the first and second lens elements; wherein there are three lenses with refractive power; and wherein the focal length of the imaging lens system is f, the focal length of the first lens element is f1, the radius of curvature of the object-side surface of the first lens element is R1, the radius of curvature of the image-side surface of the first lens element is R2, the thickness on the optical axis of the second lens element is CT2, and they satisfy the relations: $|f/f1|<0.58$, $0.20<R1/f<0.65$, $0.00<R2/f<2.40$, $0.10 \text{ mm}<CT2<1.00 \text{ mm}$.

The present invention provides another imaging lens system comprising, in order from the object side to the image side: a first lens element having a convex object-side surface; a second lens element with positive refractive power, the object-side and image-side surfaces thereof being aspheric; and a third lens element with negative refractive power having a concave object-side surface and a convex image-side surface, the object-side and image-side surfaces thereof being aspheric; wherein there are three lenses with refractive power; and wherein the focal length of the imaging lens system is f, the focal length of the first lens element is f1, the focal length of the third lens element is f3, the radius of curvature of the object-side surface of the second lens element is R3, the radius of curvature of the image-side surface of the second lens element is R4, the radius of curvature of the image-side surface of the third lens element is R6, and they satisfy the relations: $|f/f1|<0.58$, $|R3/R4|>0.94$, $-0.75<f/f3<-0.05$, $R6/f3>0$.

The present invention provides yet another imaging lens system comprising, in order from the object side to the image side: a first lens element having a convex object-side surface; a second lens element with positive refractive power, the object-side and image-side surfaces thereof being aspheric; a third lens element with negative refractive power, the object-side and image-side surfaces thereof being aspheric and at least one of which being provided with at least one inflection point; and a stop disposed in front of the first lens element; wherein there are three lenses with refractive power; and wherein the focal length of the imaging lens system is f, the focal length of the first lens element is f1, the radius of curvature of the object-side surface of the second lens element is R3, the radius of curvature of the image-side surface of the second lens element is R4, the thickness on the optical axis of the second lens element is CT2, and they satisfy the relations: $|f/f1|<0.58$, $|R3/R4|>0.94$, $0.10 \text{ mm}<CT2<1.00 \text{ mm}$.

With the aforementioned arrangement of optical lenses, the size of the imaging lens system can be reduced effectively, and the sensitivity of the optical system can be attenuated. Moreover, such an arrangement enables the imaging lens system to obtain higher resolution.

In the aforementioned imaging lens system, the first lens element may have either positive or negative refractive power. When the first lens element has positive refractive power, the proportion of the positive refractive power contributed by the second lens element can be effectively reduced, and the sensitivity of the imaging lens system can be favorably attenuated. When the first lens element has negative refractive power, the field of view of the imaging lens system can be favorably enlarged. The second lens element with positive refractive power provides the majority of the refractive power of the system so that the total track length of the system can be effectively controlled to prevent the size of the imaging lens system from becoming too large. The third lens element with negative refractive power and the second lens element with positive refractive power form a telephoto structure so that the total track length of the imaging lens system can be effectively reduced.

In the aforementioned imaging lens system, the first lens element has a convex object-side surface and a concave image-side surface so that the field of view of the imaging lens system can be favorably enlarged. The second lens element may be a bi-convex lens or a meniscus lens having a concave object-side surface and a convex image-side surface. When the second lens element is a bi-convex lens, the positive refractive power thereof can be distributed more favorably, thus allowing a shortening of the total track length of the imaging lens system. When the second lens element is a meniscus lens, the aberrations of the system can be favorably corrected, and the sensitivity of the system can be attenuated as well. When the third lens element has a concave object-side surface and a convex image-side surface, the astigmatism of the system can be favorably corrected.

In the present imaging lens system, the aperture stop can be disposed between an imaged object and the first lens element or between the first and second lens elements. The second lens element provides positive refractive power, and the aperture stop is disposed near the object side of the imaging lens system, thereby the total track length of the system can be reduced effectively. The aforementioned arrangement also enables the exit pupil of the imaging lens system to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the third lens element is provided with at least one inflection point, thereby the angle at which the light is projected onto the sensor from the off-axis field can be effectively reduced to further correct the off-axis aberrations. For an optical system with a wide field of view, it requires special effort to correct the distortion and chromatic aberration of magnification, and the correction can be made by placing the stop in a location where the refractive power of the system is balanced. Such an arrangement of the aperture stop also effectively reduces the sensitivity of the system. In the present imaging lens system, when the aperture stop is disposed between the first and second lens elements, the emphasis is on the wide field of view so that the sensitivity of the system can be effectively attenuated. When the aperture stop is disposed near the imaged object, the telecentric feature is emphasized and this enables a shorter total track length.

BRIEF DESCRIPTION OF THE DRAWINGS

FIG. 9 is TABLE 1 which lists the optical data of the first embodiment.

FIG. 10 is TABLE 2 which lists the aspheric surface data of the first embodiment.

FIG. 11 is TABLE 3 which lists the optical data of the second embodiment.

FIG. 12 is TABLE 4 which lists the aspheric surface data of the second embodiment.

FIG. 13 is TABLE 5 which lists the optical data of the third embodiment.

FIG. 14 is TABLE 6 which lists the aspheric surface data of the third embodiment.

FIG. 15 is TABLE 7 which lists the optical data of the fourth embodiment.

FIG. 16 is TABLE 8 which lists the aspheric surface data of the fourth embodiment.

FIG. 17 is TABLE 9 which lists the data of the respective embodiments resulting from the equations.

DETAILED DESCRIPTION OF THE PREFERRED EMBODIMENTS

Figure 1:
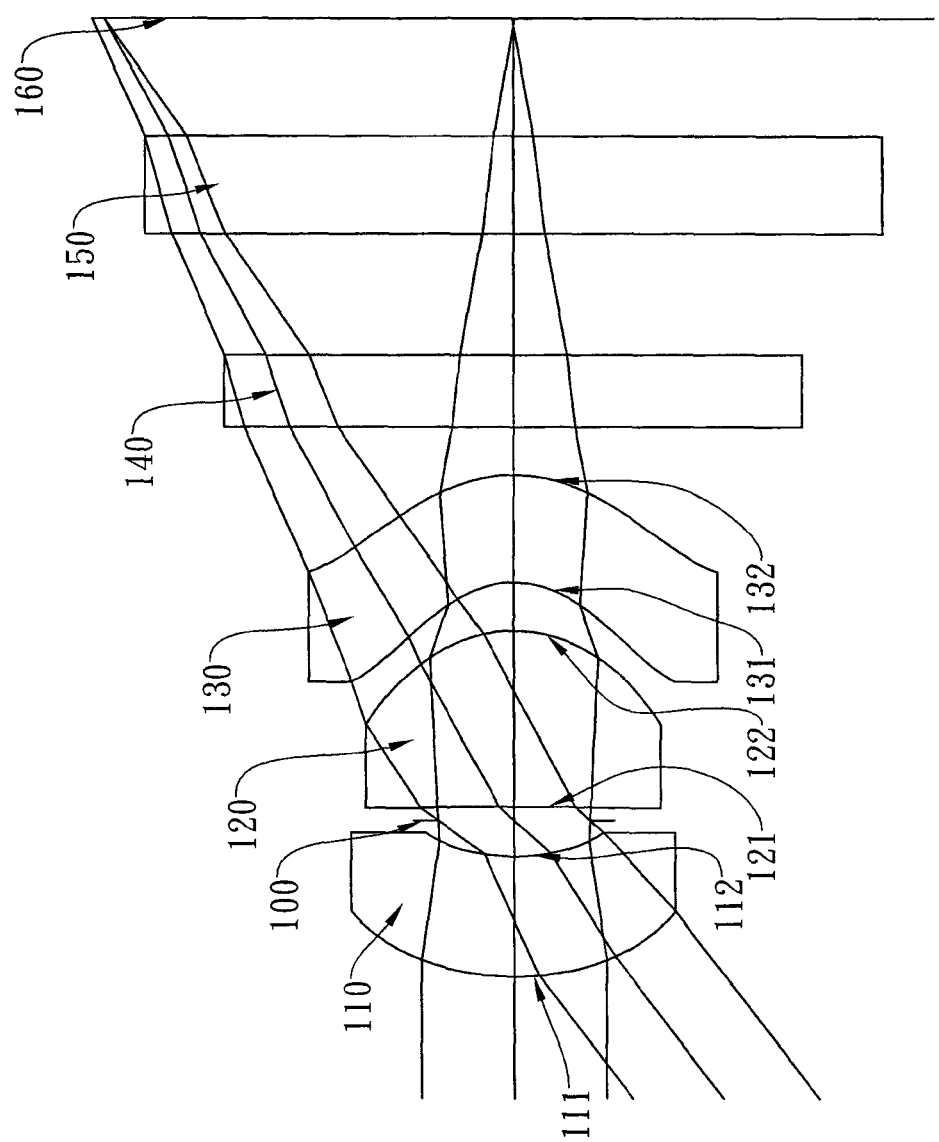
FIG. 1 shows an imaging lens system in accordance with a first embodiment of the present invention.

The present invention provides an imaging lens system comprising, in order from an object side to an image side: a first lens element having a convex object-side surface and a concave image-side surface; a second lens element with positive refractive power, the object-side and image-side surfaces thereof being aspheric; a third lens element with negative refractive power, the object-side and image-side surfaces thereof being aspheric and at least one of which being provided with at least one inflection point; and an aperture stop disposed between the first and second lens elements; wherein there are three lenses with refractive power; and wherein the focal length of the imaging lens system is f, the focal length of the first lens element is f1, the radius of curvature of the object-side surface of the first lens element is R1, the radius of curvature of the image-side surface of the first lens element is R2, the thickness on the optical axis of the second lens element is CT2, and they satisfy the relations: $|f/f1|<0.58$, $0.20<R1/f<0.65$, $0.00<R2/f<2.40$, $0.10 \text{ mm}<CT2<1.00 \text{ mm}$.

When the relation of $|f/f1|<0.58$ is satisfied, the refractive power of the first lens element will not be too strong, thereby the sensitivity of the imaging lens system can be favorably attenuated and the aberrations can be prevented from becoming too large. Preferably, f and f1 satisfy the relation: $|f/f1|<0.40$. When the relation of $0.20<R1/f<0.65$ is satisfied, a balance between the reduction of the total track length of the imaging lens system and the correction of the high order aberrations can be favorably achieved. Preferably, R1 and f satisfy the relation: $0.40<R1/f<0.55$. When the relation of $0.00<R2/f<2.40$ is satisfied, the field of view of the imaging lens system can be favorably enlarged. When the relation of $0.10 \text{ mm}<CT2<1.00 \text{ mm}$ is satisfied, the moldability and homogeneity of the plastic-injection-molded lenses can be improved, and the total track length of the imaging lens system can be reduced more favorably. Preferably, CT2 satisfies the relation: $0.10 \text{ mm}<CT2<0.75 \text{ mm}$.

In the aforementioned imaging lens system, it is preferable that the image-side surface of the second lens element is convex and the second and third lens elements are made of plastic material. When the second lens element is a bi-convex lens, the positive refractive power thereof can be distributed more favorably, thus allowing a shortening of the total track length of the imaging lens system. When the second lens element is a meniscus lens, the astigmatism of the system can be corrected more favorably. Plastic lenses are favorable not only for the formation of aspheric surfaces but also for the significant reduction of the production cost.

In the aforementioned imaging lens system, it is preferable that the first lens element has negative refractive power so that the field of view of the imaging lens system can be favorably enlarged. Preferably, at least one of the object-side and image-side surfaces of the first lens element is aspheric. Aspheric surfaces can be easily made into non-spherical profiles, allowing more design parameter freedom which can be used to reduce aberrations and the number of the lenses, so that the total track length of the imaging lens system can be effectively reduced.

In the aforementioned imaging lens system, the focal length of the imaging lens system is f, the focal length of the second lens element is f2, and they preferably satisfy the relation: 1.4<f/f2<2.3. When the above relation is satisfied, the refractive power of the second lens element is more balanced so that the total track length of the system can be effectively controlled to keep the imaging lens system compact. The satisfaction of the above relation also prevents the high order spherical aberration from becoming too large, so that the image quality can be improved.

In the aforementioned imaging lens system, the radius of curvature of the object-side surface of the second lens element is R3, the radius of curvature of the image-side surface of the second lens element is R4, and they preferably satisfy the relation: |R3/R4|>1.30. When the above relation is satisfied, the total track length of the system can be favorably reduced, and the spherical aberration of the system can be prevented from becoming too large.

In the aforementioned imaging lens system, the focal length of the imaging lens system is f, the distance on the optical axis between the second and third lens elements is T23, and they preferably satisfy the relation: 0.5<(T23/f)×100<12.0. When the above relation is satisfied, the high order aberrations of the imaging lens system can be favorably corrected. The satisfaction of the above relation also enables the lenses to be spaced closer together, and the total track length of the system can be favorably reduced to keep the imaging lens system compact.

In the aforementioned imaging lens system, the Abbe number of the first lens element is V1, the Abbe number of the second lens element is V2, and they preferably satisfy the relation: 25.0<V2−V1<40.0. When the above relation is satisfied, the chromatic aberration of the imaging lens system can be favorably corrected.

In the aforementioned imaging lens system, the focal length of the imaging lens system is f, the focal length of the third lens element is f3, and they preferably satisfy the relation: −0.50<f/f3<−0.10. When the above relation is satisfied, the telephoto structure formed by the second and third lens elements can be favorably secured, thereby effectively reducing the total track length of the imaging lens system.

The aforementioned imaging lens system further comprises an electronic sensor on which an object is imaged. The distance on the optical axis between the object-side surface of the first lens element and the electronic sensor is TTL, half of the diagonal length of the effective pixel area of the electronic sensor is ImgH, and they preferably satisfy the relation: TTL/ImgH<2.50. The satisfaction of the above relation is favorable for the imaging lens system to maintain a compact form and be equipped in compact electronic products.

The present invention provides another imaging lens system comprising, in order from the object side to the image side: a first lens element having a convex object-side surface; a second lens element with positive refractive power, the object-side and image-side surfaces thereof being aspheric; and a third lens element with negative refractive power having a concave object-side surface and a convex image-side surface, the object-side and image-side surfaces thereof being aspheric; wherein there are three lenses with refractive power; and wherein the focal length of the imaging lens system is f, the focal length of the first lens element is f1, the focal length of the third lens element is f3, the radius of curvature of the object-side surface of the second lens element is R3, the radius of curvature of the image-side surface of the second lens element is R4, the radius of curvature of the image-side surface of the third lens element is R6, and they satisfy the relations: |f/f1|<0.58, |R3/R4|>0.94, −0.75<f/f3<−0.05, R6/f3>0.

In the aforementioned imaging lens system, when the relation of |f/f1|<0.58 is satisfied, the refractive power of the first lens element will not be too strong, thereby the sensitivity of the imaging lens system can be favorably attenuated and the aberrations can be prevented from becoming too large. Preferably, f and f1 satisfy the relation: |f/f1|<0.40. When the relation of |R3/R4|>0.94 is satisfied, the total track length of the imaging lens system can be favorably reduced, and the spherical aberration of the imaging lens system can be prevented from becoming too large. When the relation of −0.75<f/f3<−0.05 is satisfied, the telephoto structure formed by the second and third lens elements can be favorably secured, thereby effectively reducing the total track length of the imaging lens system. When the relation of R6/f3>0 is satisfied, the high order aberrations of the imaging lens system can be favorably corrected.

In the aforementioned imaging lens system, it is preferable that the first lens element has negative refractive power so that the field of view of the imaging lens system can be favorably enlarged.

In the aforementioned imaging lens system, the focal length of the imaging lens system is f, the focal length of the second lens element is f2, and they preferably satisfy the relation: 1.4<f/f2<2.3. When the above relation is satisfied, the refractive power of the second lens element is more balanced so that the total track length of the system can be effectively controlled to keep the imaging lens system compact. The satisfaction of the above relation also prevents the high order spherical aberration from becoming too large, so that the image quality can be improved. And it will be more preferable that f and f2 satisfy the relation: 1.7<f/f2<2.3.

In the aforementioned imaging lens system, the Abbe number of the first lens element is V1, the Abbe number of the second lens element is V2, and they preferably satisfy the relation: 25.0<V2−V1<40.0. When the above relation is satisfied, the chromatic aberration of the imaging lens system can be favorably corrected.

In the aforementioned imaging lens system, the focal length of the imaging lens system is f, the focal length of the third lens element is f3, and they preferably satisfy the relation: −0.50<f/f3<−0.10. When the above relation is satisfied, the telephoto structure formed by the second and third lens elements can be favorably secured, thereby effectively reducing the total track length of the imaging lens system.

In the aforementioned imaging lens system, the radius of curvature of the object-side surface of the third lens element is R5, the radius of curvature of the image-side surface of the third lens element is R6, and they preferably satisfy the relation: 0.4<R5/R6<1.5. When the above relation is satisfied, the astigmatism of the imaging lens system can be favorably corrected.

In the aforementioned imaging lens system, the focal length of the imaging lens system is f, the distance on the optical axis between the second and third lens elements is T23, and they preferably satisfy the relation: 0.5<(T23/f)×100<12.0. When the above relation is satisfied, the high order aberrations of the imaging lens system can be favorably corrected. The satisfaction of the above relation also enables the lenses to be spaced closer together, and the total track length of the system can be favorably reduced to keep the imaging lens system compact.

The present invention provides yet another imaging lens system comprising, in order from the object side to the image side: a first lens element having a convex object-side surface;

a second lens element with positive refractive power, the object-side and image-side surfaces thereof being aspheric; a third lens element with negative refractive power, the object-side and image-side surfaces thereof being aspheric and at least one of which being provided with at least one inflection point; and an aperture stop disposed in front of the first lens element; wherein there are three lenses with refractive power; and wherein the focal length of the imaging lens system is f, the focal length of the first lens element is f1, the radius of curvature of the object-side surface of the second lens element is R3, the radius of curvature of the image-side surface of the second lens element is R4, the thickness on the optical axis of the second lens element is CT2, and they satisfy the relations: |f/f1|<0.58, |R3/R4|>0.94, 0.10 mm<CT2<1.00 mm.

In the aforementioned imaging lens system, when the relation of |f/f1|<0.58 is satisfied, the refractive power of the first lens element will not be too strong, thereby the sensitivity of the imaging lens system can be favorably attenuated and the aberrations can be prevented from becoming too large. When the relation of |R3/R4|>0.94 is satisfied, the total track length of the imaging lens system can be favorably reduced, and the spherical aberration of the system can be prevented from becoming too large. When the relation of 0.10 mm<CT2<1.00 mm is satisfied, the moldability and homogeneity of the plastic-injection-molded lenses can be improved, and the total track length of the imaging lens system can be reduced more favorably. Preferably, CT2 satisfies the relation: 0.10 mm<CT2<0.75 mm.

In the aforementioned imaging lens system, the focal length of the imaging lens system is f, the distance on the optical axis between the second and third lens elements is T23, and they preferably satisfy the relation: 0.5<(T23/f)×100<7.0. When the above relation is satisfied, the high order aberrations of the imaging lens system can be favorably corrected. The satisfaction of the above relation also enables the lenses to be spaced closer together, and the total track length of the system can be favorably reduced to keep the imaging lens system compact.

In the aforementioned imaging lens system, the focal length of the imaging lens system is f, the focal length of the third lens element is f3, the radius of curvature of the object-side surface of the third lens element is R5, the radius of curvature of the image-side surface of the third lens element is R6, and they satisfy the relations: −0.50<f/f3<−0.10, 0.5<R5/R6<1.5. When the relation of 0.50<f/f3<−0.10 is satisfied, the telephoto structure formed by the second and third lens elements can be favorably secured, thereby effectively reducing the total track length of the imaging lens system. When the relation of 0.5<R5/R6<1.5 is satisfied, the astigmatism of the imaging lens system can be favorably corrected.

In the present imaging lens system, the lenses can be made of glass or plastic material. If the lenses are made of glass, there is more freedom in distributing the refractive power of the system. If plastic material is adopted to produce the lenses, the production cost will be reduced effectively. Additionally, the surfaces of the lenses can be aspheric and easily made into non-spherical profiles, allowing more design parameter freedom which can be used to reduce aberrations and the number of the lenses. Consequently, the total track length of the imaging lens system can be effectively reduced.

In the present imaging lens system, if a lens element has a convex surface, it means the portion of the surface proximate to the optical axis is convex; if a lens element has a concave surface, it means the portion of the surface proximate to the optical axis is concave.

Preferred embodiments of the present invention will be described in the following paragraphs by referring to the accompanying drawings.

Figure 2:
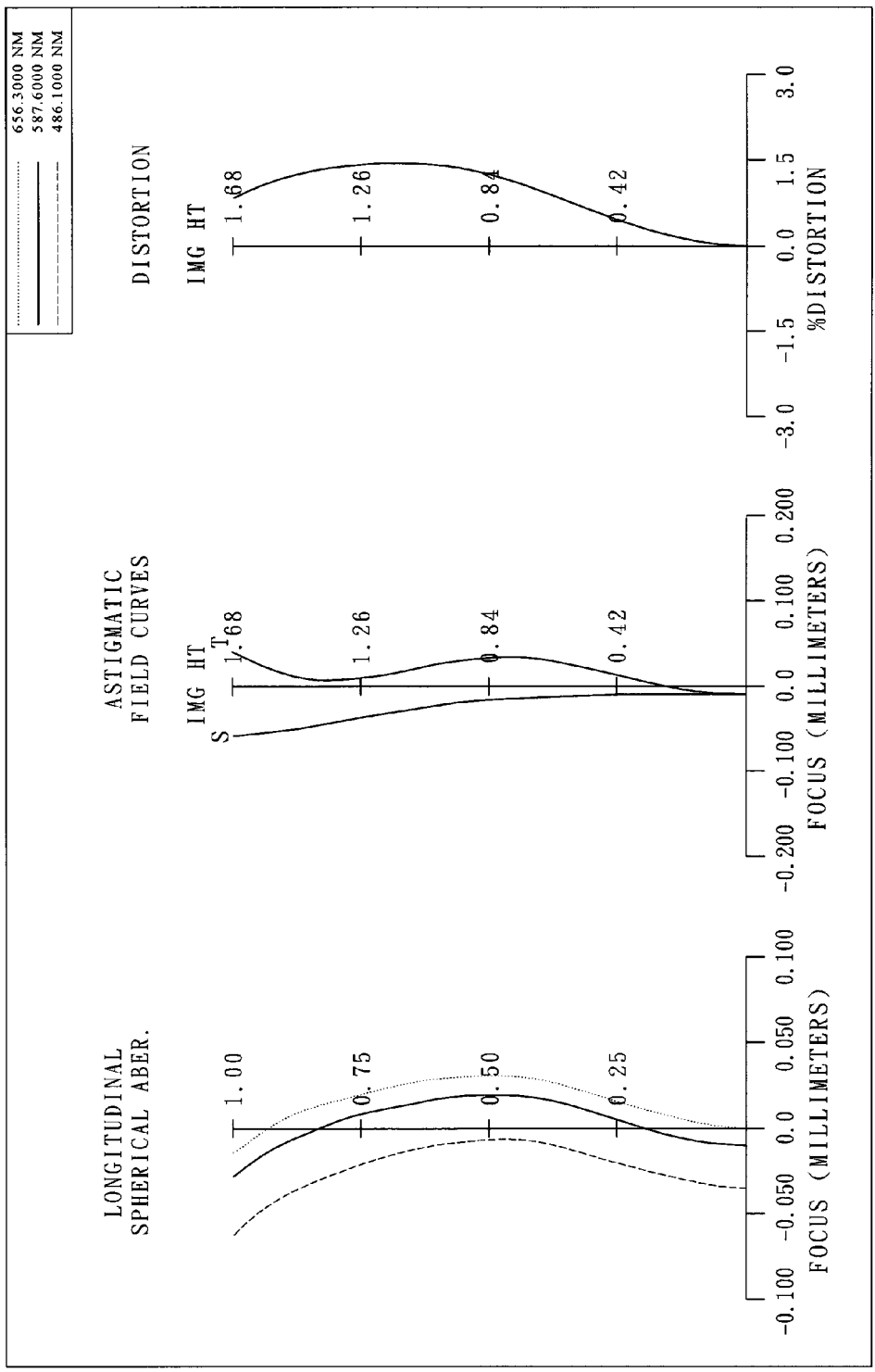
FIG. 2 shows the aberration curves of the first embodiment of the present invention.

FIG. 1 shows an imaging lens system in accordance with a first embodiment of the present invention, and FIG. 2 shows the aberration curves of the first embodiment of the present invention. The imaging lens system of the first embodiment of the present invention mainly comprises three lenses, in order from an object side to an image side: a plastic first lens element 110 with negative refractive power having a convex object-side surface 111 and a concave image-side surface 112, the object-side and image-side surfaces 111 and 112 thereof being aspheric; a plastic second lens element 120 with positive refractive power having a convex object-side surface 121 and a convex image-side surface 122, the object-side and image-side surfaces 121 and 122 thereof being aspheric; and a plastic third lens element 130 with negative refractive power having a concave object-side surface 131 and a convex image-side surface 132, the object-side and image-side surfaces 131 and 132 thereof being aspheric and each of which being provided with at least one inflection point; wherein an aperture stop 100 is disposed between the first lens element 110 and the second lens element 120; wherein an IR filter 140 is disposed between the image-side surface 132 of the third lens element 130 and an image plane 160 and a cover glass 150 is disposed between the IR filter 140 and the image plane 160; and wherein the IR filter 140 and the cover glass 150 are made of glass and have no influence on the focal length of the imaging lens system.

The equation of the aspheric surface profiles is expressed as follows:

$$X(Y) = (Y^2/R)/(1 + sqrt(1 - (1+k) \times (Y/R)^2)) + \sum_i (Ai)*(Y^i)$$

wherein:
X: the height of a point on the aspheric surface at a distance Y from the optical axis relative to the tangential plane at the aspheric surface vertex;
Y: the distance from the point on the curve of the aspheric surface to the optical axis;
k: the conic coefficient;
Ai: the aspheric coefficient of order i.

In the first embodiment of the present imaging lens system, the focal length of the imaging lens system is f, and it satisfies the relation: f=2.17 (mm).

In the first embodiment of the present imaging lens system, the f-number of the imaging lens system is Fno, and it satisfies the relation: Fno=2.85.

In the first embodiment of the present imaging lens system, half of the maximal field of view of the imaging lens system is HFOV, and it satisfies the relation: HFOV=37.5 deg.

In the first embodiment of the present imaging lens system, the Abbe number of the first lens element 110 is V1, the Abbe number of the second lens element 120 is V2, and they satisfy the relation: V2−V1=32.5.

In the first embodiment of the present imaging lens system, the thickness on the optical axis of the second lens element 120 is CT2, and it satisfies the relation: CT2=0.73 (mm).

In the first embodiment of the present imaging lens system, the focal length of the imaging lens system is f, the distance on the optical axis between the second lens element 120 and the third lens element 130 is T23, and they satisfy the relation: (T23/f)×100=9.2.

In the first embodiment of the present imaging lens system, the focal length of the imaging lens system is f, the radius of curvature of the object-side surface 111 of the first lens element 110 is R1, and they satisfy the relation: R1/f=0.52.

In the first embodiment of the present imaging lens system, the focal length of the imaging lens system is f, the radius of curvature of the image-side surface 112 of the first lens element 110 is R2, and they satisfy the relation: R2/f=0.40.

In the first embodiment of the present imaging lens system, the focal length of the third lens element 130 is f3, the radius of curvature of the image-side surface 132 of the third lens element 130 is R6, and they satisfy the relation: R6/f3=0.12.

In the first embodiment of the present imaging lens system, the radius of curvature of the object-side surface 121 of the second lens element 120 is R3, the radius of curvature of the image-side surface 122 of the second lens element 120 is R4, and they satisfy the relation: |R3/R4|=56.41

In the first embodiment of the present imaging lens system, the radius of curvature of the object-side surface 131 of the third lens element 130 is R5, the radius of curvature of the image-side surface 132 of the third lens element 130 is R6, and they satisfy the relation: R5/R6=0.61.

In the first embodiment of the present imaging lens system, the focal length of the imaging lens system is f, the focal length of the first lens element 110 is f1, and they satisfy the relation: |f/f1|=0.08.

In the first embodiment of the present imaging lens system, the focal length of the imaging lens system is f, the focal length of the second lens element 120 is f2, and they satisfy the relation: f/f2=2.13.

In the first embodiment of the present imaging lens system, the focal length of the imaging lens system is f, the focal length of the third lens element 130 is f3, and they satisfy the relation: f/f3=−0.41.

In the first embodiment of the present imaging lens system, the distance on the optical axis between the object-side surface 111 of the first lens element 110 and the electronic sensor is TTL, half of the diagonal length of the effective pixel area of the electronic sensor is ImgH, and they satisfy the relation: TTL/ImgH=2.22.

The detailed optical data of the first embodiment is shown in FIG. 9 (TABLE 1), and the aspheric surface data is shown in FIG. 10 (TABLE 2), wherein the units of the radius of curvature, the thickness and the focal length are expressed in mm, and HFOV is half of the maximal field of view.

Figure 3:
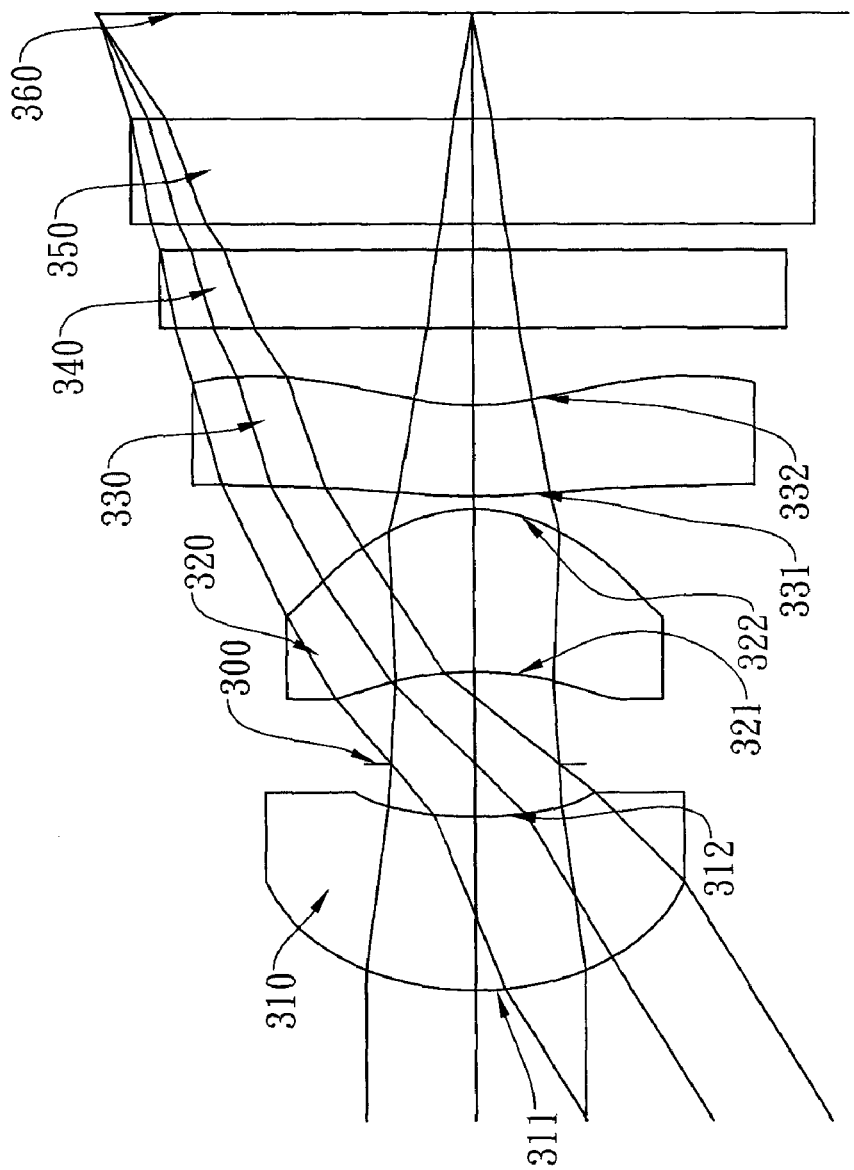
FIG. 3 shows an imaging lens system in accordance with a second embodiment of the present invention.
Figure 4:
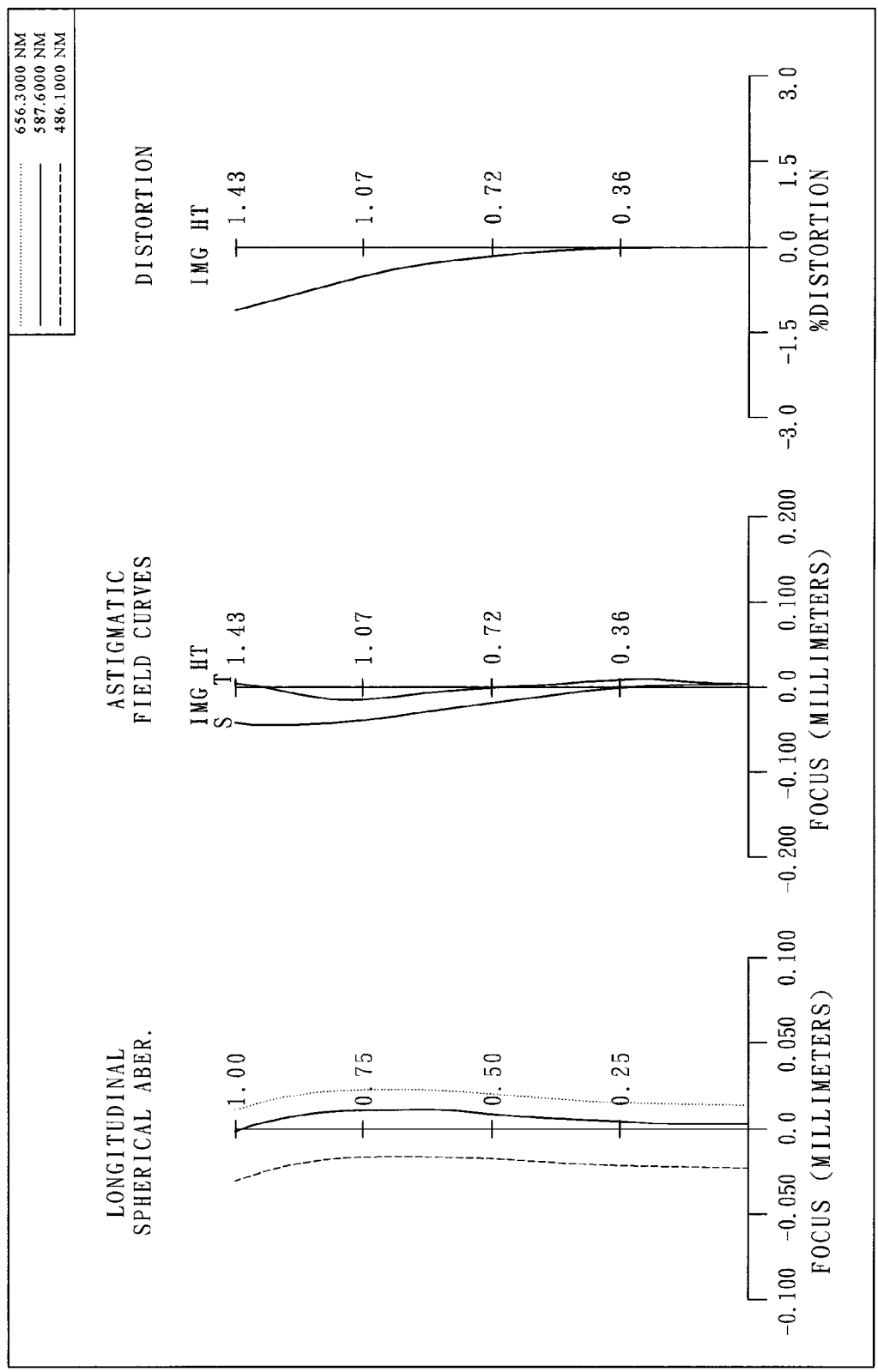
FIG. 4 shows the aberration curves of the second embodiment of the present invention.

FIG. 3 shows an imaging lens system in accordance with a second embodiment of the present invention, and FIG. 4 shows the aberration curves of the second embodiment of the present invention. The imaging lens system of the second embodiment of the present invention mainly comprises three lenses, in order from the object side to the image side: a plastic first lens element 310 with positive refractive power having a convex object-side surface 311 and a concave image-side surface 312, the object-side and image-side surfaces 311 and 312 thereof being aspheric; a plastic second lens element 320 with positive refractive power having a concave object-side surface 321 and a convex image-side surface 322, the object-side and image-side surfaces 321 and 322 thereof being aspheric; and a plastic third lens element 330 with negative refractive power having a convex object-side surface 331 and a concave image-side surface 332, the object-side and image-side surfaces 331 and 332 thereof being aspheric and each of which being provided with at least one inflection point; wherein an aperture stop 300 is disposed between the first lens element 310 and the second lens element 320; wherein an IR filter 340 is disposed between the image-side surface 332 of the third lens element 330 and an image plane 360 and a cover glass 350 is disposed between the IR filter 340 and the image plane 360; and wherein the IR filter 340 and the cover glass 350 are made of glass and have no influence on the focal length of the imaging lens system.

The equation of the aspheric surface profiles of the second embodiment has the same form as that of the first embodiment.

In the second embodiment of the present imaging lens system, the focal length of the imaging lens system is f, and it satisfies the relation: f=2.34 (mm).

In the second embodiment of the present imaging lens system, the f-number of the imaging lens system is Fno, and it satisfies the relation: Fno=2.80.

In the second embodiment of the present imaging lens system, half of the maximal field of view of the imaging lens system is HFOV, and it satisfies the relation: HFOV=31.7 deg.

In the second embodiment of the present imaging lens system, the Abbe number of the first lens element 310 is V1, the Abbe number of the second lens element 320 is V2, and they satisfy the relation: V2−V1=0.0.

In the second embodiment of the present imaging lens system, the thickness on the optical axis of the second lens element 320 is CT2, and it satisfies the relation: CT2=0.63 (mm).

In the second embodiment of the present imaging lens system, the focal length of the imaging lens system is f, the distance on the optical axis between the second lens element 320 and the third lens element 330 is T23, and they satisfy the relation: (T23/f)×100=2.1.

In the second embodiment of the present imaging lens system, the focal length of the imaging lens system is f, the radius of curvature of the object-side surface 311 of the first lens element 310 is R1, and they satisfy the relation: R1/f=0.52.

In the second embodiment of the present imaging lens system, the focal length of the imaging lens system is f, the radius of curvature of the image-side surface 312 of the first lens element 310 is R2, and they satisfy the relation: R2/f=0.74.

In the second embodiment of the present imaging lens system, the focal length of the third lens element 330 is f3, the radius of curvature of the image-side surface 332 of the third lens element 330 is R6, and they satisfy the relation: R6/f3=−0.33.

In the second embodiment of the present imaging lens system, the radius of curvature of the object-side surface 321 of the second lens element 320 is R3, the radius of curvature of the image-side surface 322 of the second lens element 320 is R4, and they satisfy the relation: |R3/R4|=2.32.

In the second embodiment of the present imaging lens system, the radius of curvature of the object-side surface 331 of the third lens element 330 is R5, the radius of curvature of the image-side surface 332 of the third lens element 330 is R6, and they satisfy the relation: R5/R6=2.88.

In the second embodiment of the present imaging lens system, the focal length of the imaging lens system is f, the focal length of the first lens element 310 is f1, and they satisfy the relation: |f/f1|=0.45.

In the second embodiment of the present imaging lens system, the focal length of the imaging lens system is f, the focal length of the second lens element 320 is f2, and they satisfy the relation: f/f2=1.59.

In the second embodiment of the present imaging lens system, the focal length of the imaging lens system is f, the focal length of the third lens element 330 is f3, and they satisfy the relation: f/f3=−0.82.

In the second embodiment of the present imaging lens system, the distance on the optical axis between the object-side surface 311 of the first lens element 310 and the electronic sensor is TTL, half of the diagonal length of the effective pixel area of the electronic sensor is ImgH, and they satisfy the relation: TTL/ImgH=2.46.

The detailed optical data of the second embodiment is shown in FIG. 11 (TABLE 3), and the aspheric surface data is shown in FIG. 12 (TABLE 4), wherein the units of the radius of curvature, the thickness and the focal length are expressed in mm, and HFOV is half of the maximal field of view.

Figure 5:
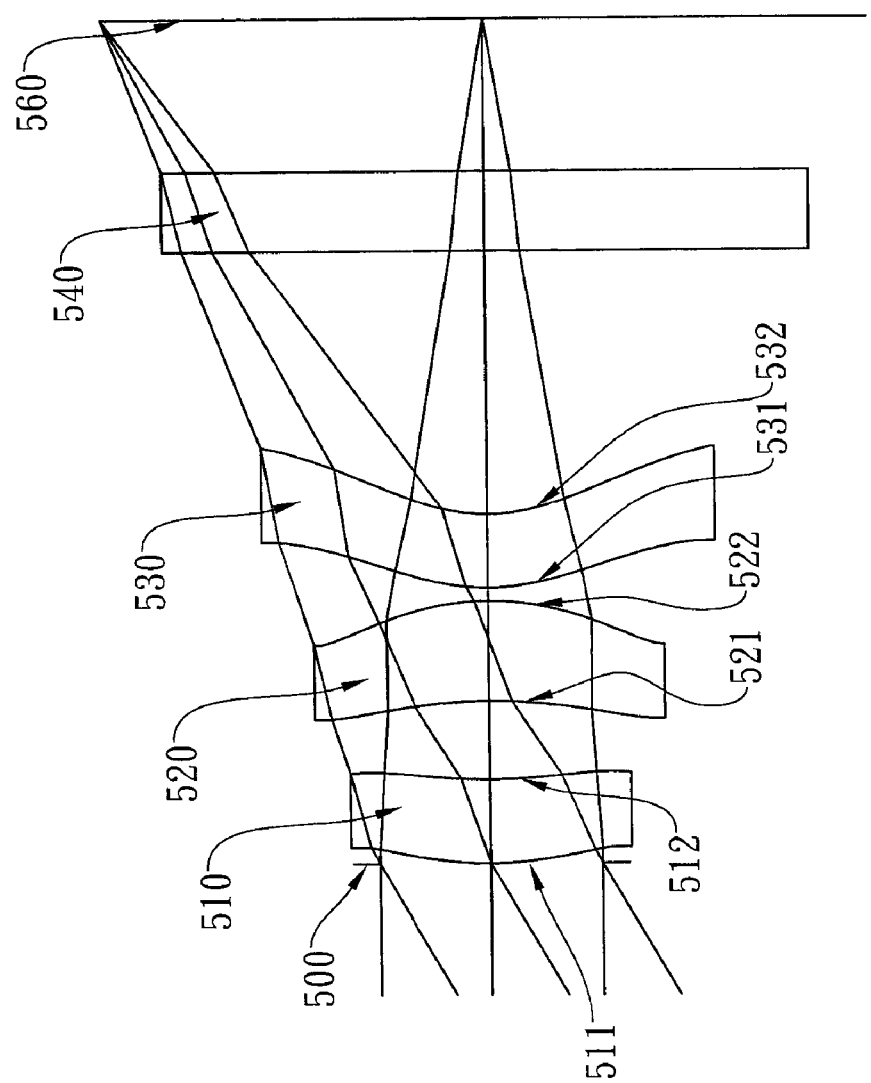
FIG. 5 shows an imaging lens system in accordance with a third embodiment of the present invention.
Figure 6:
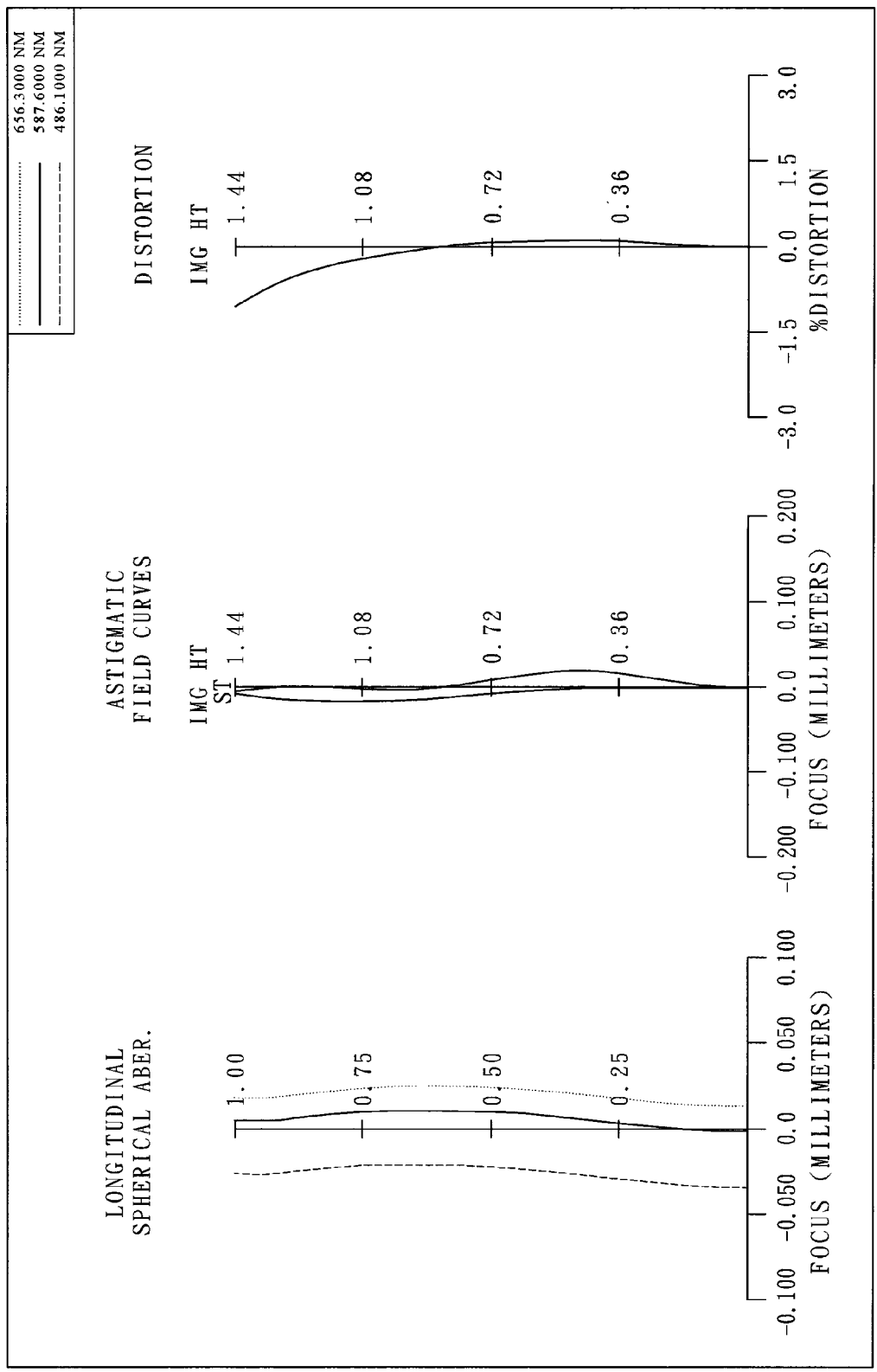
FIG. 6 shows the aberration curves of the third embodiment of the present invention.

FIG. 5 shows an imaging lens system in accordance with a third embodiment of the present invention, and FIG. 6 shows the aberration curves of the third embodiment of the present invention. The imaging lens system of the third embodiment of the present invention mainly comprises three lenses, in order from the object side to the image side: a plastic first lens element 510 with positive refractive power having a convex object-side surface 511 and a concave image-side surface 512, the object-side and image-side surfaces 511 and 512 thereof being aspheric; a plastic second lens element 520 with positive refractive power having a concave object-side surface 521 and a convex image-side surface 522, the object-side and image-side surfaces 521 and 522 thereof being aspheric; and a plastic third lens element 530 with negative refractive power having a convex object-side surface 531 and a concave image-side surface 532, the object-side and image-side surfaces 531 and 532 thereof being aspheric and each of which being provided with at least one inflection point; wherein an aperture stop 500 is disposed between an imaged object and the first lens element 510; wherein an IR filter 540 is disposed between the image-side surface 532 of the third lens element 530 and an image plane 560; and wherein the IR filter 540 is made of glass and has no influence on the focal length of the imaging lens system.

The equation of the aspheric surface profiles of the third embodiment has the same form as that of the first embodiment.

In the third embodiment of the present imaging lens system, the focal length of the imaging lens system is f, and it satisfies the relation: f=2.53 (mm).

In the third embodiment of the present imaging lens system, the f-number of the imaging lens system is Fno, and it satisfies the relation: Fno=3.00.

In the third embodiment of the present imaging lens system, half of the maximal field of view of the imaging lens system is HFOV, and it satisfies the relation: HFOV=30.0 deg.

In the third embodiment of the present imaging lens system, the Abbe number of the first lens element 510 is V1, the Abbe number of the second lens element 520 is V2, and they satisfy the relation: V2−V1=0.0.

In the third embodiment of the present imaging lens system, the thickness on the optical axis of the second lens element 520 is CT2, and it satisfies the relation: CT2=0.38 (mm).

In the third embodiment of the present imaging lens system, the focal length of the imaging lens system is f, the distance on the optical axis between the second lens element 520 and the third lens element 530 is T23, and they satisfy the relation: (T23/f)×100=2.0.

In the third embodiment of the present imaging lens system, the focal length of the imaging lens system is f, the radius of curvature of the object-side surface 511 of the first lens element 510 is R1, and they satisfy the relation: R1/f=0.56.

In the third embodiment of the present imaging lens system, the focal length of the imaging lens system is f, the radius of curvature of the image-side surface 512 of the first lens element 510 is R2, and they satisfy the relation: R2/f=0.88.

In the third embodiment of the present imaging lens system, the focal length of the third lens element 530 is f3, the radius of curvature of the image-side surface 532 of the third lens element 530 is R6, and they satisfy the relation: R6/f3=−0.04.

In the third embodiment of the present imaging lens system, the radius of curvature of the object-side surface 521 of the second lens element 520 is R3, the radius of curvature of the image-side surface 522 of the second lens element 520 is R4, and they satisfy the relation: |R3/R4|=1.77.

In the third embodiment of the present imaging lens system, the radius of curvature of the object-side surface 531 of the third lens element 530 is R5, the radius of curvature of the image-side surface 532 of the third lens element 530 is R6, and they satisfy the relation: R5/R6=1.23.

In the third embodiment of the present imaging lens system, the focal length of the imaging lens system is f, the focal length of the first lens element 510 is f1, and they satisfy the relation: |f/f1|=0.41.

In the third embodiment of the present imaging lens system, the focal length of the imaging lens system is f, the focal length of the second lens element 520 is f2, and they satisfy the relation: f/f2=0.72.

In the third embodiment of the present imaging lens system, the focal length of the imaging lens system is f, the focal length of the third lens element 530 is f3, and they satisfy the relation: f/f3=−0.14.

In the third embodiment of the present imaging lens system, the distance on the optical axis between the object-side surface 511 of the first lens element 510 and the electronic sensor is TTL, half of the diagonal length of the effective pixel area of the electronic sensor is ImgH, and they satisfy the relation: TTL/ImgH=2.15.

The detailed optical data of the third embodiment is shown in FIG. 13 (TABLE 5), and the aspheric surface data is shown in FIG. 14 (TABLE 6), wherein the units of the radius of curvature, the thickness and the focal length are expressed in mm, and HFOV is half of the maximal field of view.

Figure 7:
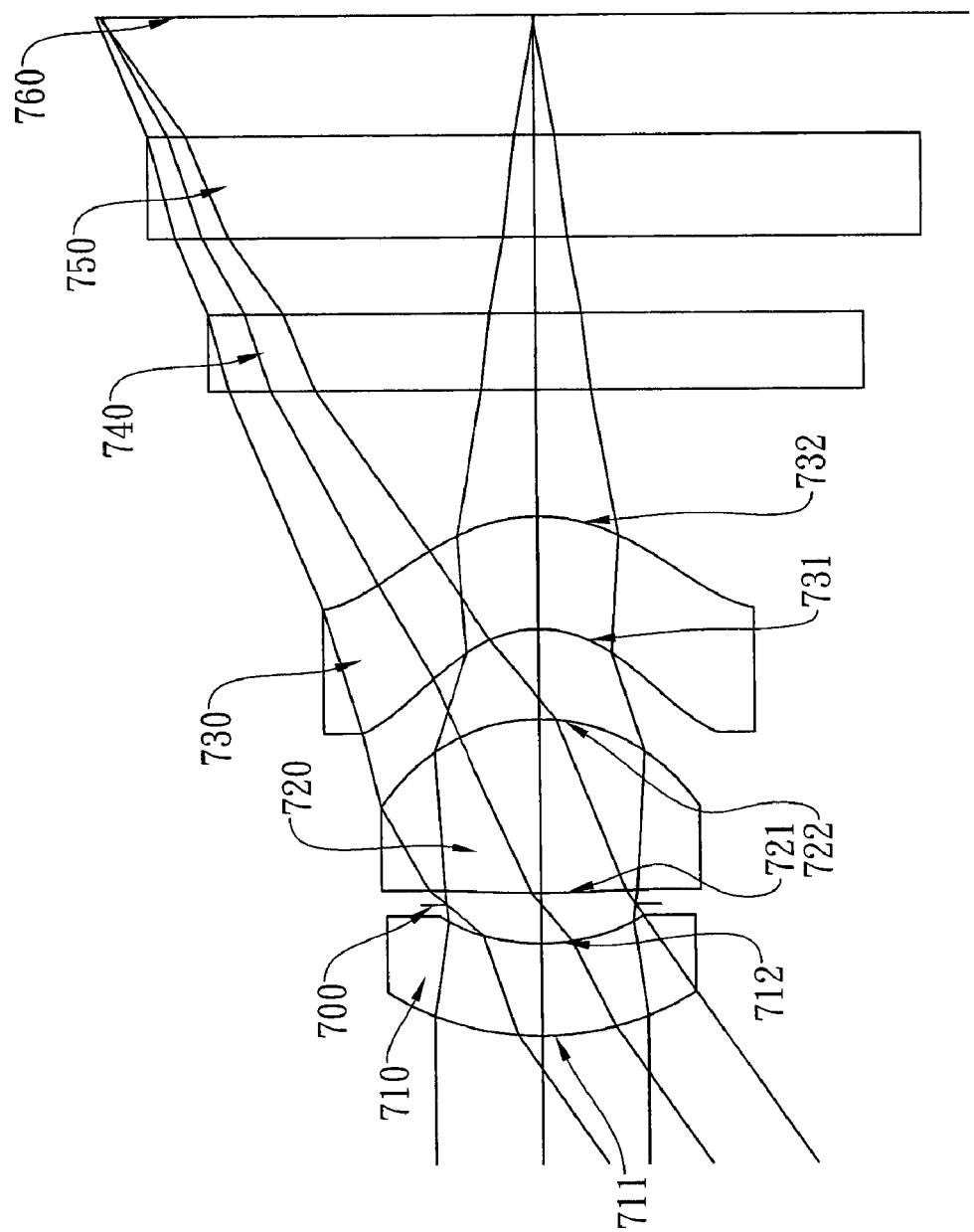
FIG. 7 shows an imaging lens system in accordance with a fourth embodiment of the present invention.
Figure 8:
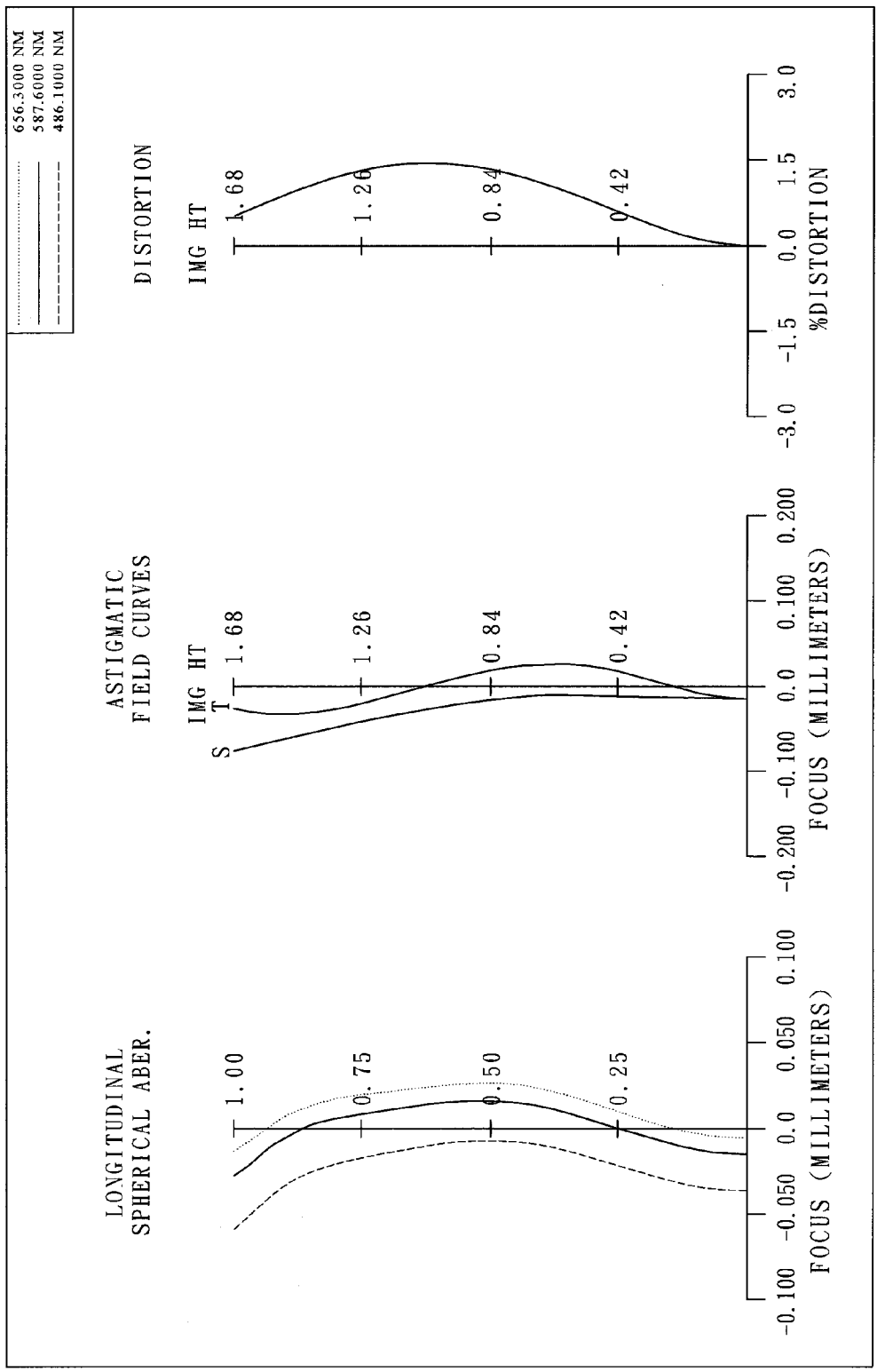
FIG. 8 shows the aberration curves of the fourth embodiment of the present invention.

FIG. 7 shows an imaging lens system in accordance with a fourth embodiment of the present invention, and FIG. 8 shows the aberration curves of the fourth embodiment of the present invention. The imaging lens system of the fourth embodiment of the present invention mainly comprises three lenses, in order from the object side to the image side: a plastic first lens element 710 with negative refractive power having a convex object-side surface 711 and a concave image-side surface 712, the object-side and image-side surfaces 711 and 712 thereof being aspheric; a plastic second lens element 720 with positive refractive power having a convex object-side surface 721 and a convex image-side surface 722, the object-side and image-side surfaces 721 and 722 thereof being aspheric; and a plastic third lens element 730 with negative refractive power having a concave object-side surface 731 and a convex image-side surface 732, the object-side and image-side surfaces 731 and 732 thereof being aspheric and each of which being provided with at least one inflection point; wherein an aperture stop 700 is disposed between the first lens element 710 and the second lens element 720; wherein an IR filter 740 is disposed between the image-side surface 732 of the third lens element 730 and an image plane 760 and a cover glass 750 is disposed between the IR filter 740 and the image plane 760; and wherein the IR filter 740 and the cover glass 750 are made of glass and have no influence on the focal length of the imaging lens system.

The equation of the aspheric surface profiles of the fourth embodiment has the same form as that of the first embodiment.

In the fourth embodiment of the present imaging lens system, the focal length of the imaging lens system is f, and it satisfies the relation: f=2.39 (mm).

In the fourth embodiment of the present imaging lens system, the f-number of the imaging lens system is Fno, and it satisfies the relation: Fno=2.85.

In the fourth embodiment of the present imaging lens system, half of the maximal field of view of the imaging lens system is HFOV, and it satisfies the relation: HFOV=35.0 deg.

In the fourth embodiment of the present imaging lens system, the Abbe number of the first lens element 710 is V1, the Abbe number of the second lens element 720 is V2, and they satisfy the relation: V2−V1=32.5.

In the fourth embodiment of the present imaging lens system, the thickness on the optical axis of the second lens element 720 is CT2, and it satisfies the relation: CT2=0.68 (mm).

In the fourth embodiment of the present imaging lens system, the focal length of the imaging lens system is f, the distance on the optical axis between the second lens element 720 and the third lens element 730 is T23, and they satisfy the relation: (T23/f)×100=14.7.

In the fourth embodiment of the present imaging lens system, the focal length of the imaging lens system is f, the radius of curvature of the object-side surface 711 of the first lens element 710 is R1, and they satisfy the relation: R1/f=0.49.

In the fourth embodiment of the present imaging lens system, the focal length of the imaging lens system is f, the radius of curvature of the image-side surface 712 of the first lens element 710 is R2, and they satisfy the relation: R2/f=0.36.

In the fourth embodiment of the present imaging lens system, the focal length of the third lens element 730 is f3, the radius of curvature of the image-side surface 732 of the third lens element 730 is R6, and they satisfy the relation: R6/f3=0.09.

In the fourth embodiment of the present imaging lens system, the radius of curvature of the object-side surface 721 of the second lens element 720 is R3, the radius of curvature of the image-side surface 722 of the second lens element 720 is R4, and they satisfy the relation: |R3/R4|=5.89.

In the fourth embodiment of the present imaging lens system, the radius of curvature of the object-side surface 731 of the third lens element 730 is R5, the radius of curvature of the image-side surface 732 of the third lens element 730 is R6, and they satisfy the relation: R5/R6=0.65.

In the fourth embodiment of the present imaging lens system, the focal length of the imaging lens system is f, the focal length of the first lens element 710 is f1, and they satisfy the relation: |f/f1|=0.25.

In the fourth embodiment of the present imaging lens system, the focal length of the imaging lens system is f, the focal length of the second lens element 720 is f2, and they satisfy the relation: f/f2=1.98.

In the fourth embodiment of the present imaging lens system, the focal length of the imaging lens system is f, the focal length of the third lens element 730 is f3, and they satisfy the relation: f/f3=−0.32.

In the fourth embodiment of the present imaging lens system, the distance on the optical axis between the object-side surface 711 of the first lens element 710 and the electronic sensor is TTL, half of the diagonal length of the effective pixel area of the electronic sensor is ImgH, and they satisfy the relation: TTL/ImgH=2.24.

The detailed optical data of the fourth embodiment is shown in FIG. 15 (TABLE 7), and the aspheric surface data is shown in FIG. 16 (TABLE 8), wherein the units of the radius of curvature, the thickness and the focal length are expressed in mm, and HFOV is half of the maximal field of view.

It is to be noted that TABLES 1-8 (illustrated in FIGS. 9-16 respectively) show different data of the different embodiments, however, the data of the different embodiments are obtained from experiments. Therefore, any imaging lens system of the same structure is considered to be within the scope of the present invention even if it uses different data. The embodiments depicted above and the appended drawings are exemplary and are not intended to limit the claim scope of the present invention. TABLE 9 (illustrated in FIG. 17) shows the data of the respective embodiments resulting from the equations.

What is claimed is:

1. An imaging lens system comprising, in order from an object side to an image side:
    a first lens element having a convex object-side surface and a concave image-side surface;
    a second lens element with positive refractive power, the object-side and image-side surfaces thereof being aspheric;
    a third lens element with negative refractive power, the object-side and image-side surfaces thereof being aspheric and at least one of the object-side and image-side surfaces having at least one inflection point; and
    an aperture stop disposed between the first and second lens elements;
    wherein there are only three lens elements with refractive power; and wherein a focal length of the imaging lens system is f, a focal length of the first lens element is f1, a radius of curvature of the object-side surface of the first lens element is R1, a radius of curvature of the image-side surface of the first lens element is R2, a thickness on the optical axis of the second lens element is CT2, a focal length of the second lens element is f2, and they satisfy the relations: |f/f1|<0.58, 0.20<R1/f<0.65, 0.00<R2/f<2.40, 0.10 mm<CT2<1.00 mm, 1.4<f/f2<2.3.

2. The imaging lens system according to claim 1, wherein the image-side surface of the second lens element is convex, and wherein the second and third lens elements are made of plastic material.

3. The imaging lens system according to claim 2, wherein the thickness on the optical axis of the second lens element is CT2, and it satisfies the relation: 0.10 mm<CT2<0.75 mm.

4. The imaging lens system according to claim 1, wherein the first lens element has negative refractive power and at least one of the object-side and image-side surfaces thereof is aspheric.

5. The imaging lens system according to claim 4, wherein an Abbe number of the first lens element is V1, an Abbe number of the second lens element is V2, and they satisfy the relation: 25.0<V2−V1<40.0.

6. The imaging lens system according to claim 5, wherein the focal length of the imaging lens system is f, a focal length of the third lens element is f3, and they satisfy the relation: −0.50<f/f3<−0.10.

7. The imaging lens system according to claim 1, wherein a radius of curvature of the object-side surface of the second lens element is R3, a radius of curvature of the image-side surface of the second lens element is R4, and they satisfy the relation: |R3/R4|>1.30.

8. The imaging lens system according to claim 7, wherein the focal length of the imaging lens system is f, a distance on the optical axis between the second and third lens elements is T23, and they satisfy the relation: 0.5<(T23/f)×100<12.0.

9. The imaging lens system according to claim 7, wherein the object-side surface of the second lens element is convex.

10. The imaging lens system according to claim 1, wherein the focal length of the imaging lens system is f, the focal length of the first lens element is f1, and they satisfy the relation: |f/f1|<0.40.

11. The imaging lens system according to claim 1, wherein the focal length of the imaging lens system is f, the radius of curvature of the object-side surface of the first lens element is R1, and they satisfy the relation: 0.40<R1/f<0.55.

12. The imaging lens system according to claim 1 further comprising an electronic sensor on which an object is imaged, wherein a distance on the optical axis between the object-side surface of the first lens element and the electronic sensor is TTL, half of the diagonal length of the effective pixel area of the electronic sensor is ImgH, and they satisfy the relation: TTL/ImgH<2.50.

13. An imaging lens system comprising, in order from an object side to an image side:
a first lens element having a convex object-side surface;
a second lens element with positive refractive power, the object-side and image-side surfaces thereof being aspheric; and
a third lens element with negative refractive power having a concave object-side surface and a convex image-side surface, the object-side and image-side surfaces thereof being aspheric; wherein there are only three lens elements with refractive power; and wherein a focal length of the imaging lens system is f, a focal length of the first lens element is f1, a focal length of the third lens element is f3, a radius of curvature of the object-side surface of the second lens element is R3, a radius of curvature of the image-side surface of the second lens element is R4, a radius of curvature of the image-side surface of the third lens element is R6, and they satisfy the relations: |f/f1|<0.58, |R3/R4|>0.94, −0.75<f/f3<−0.05, R6/f3>0.

14. The imaging lens system according to claim 13, wherein the focal length of the imaging lens system is f, a focal length of the second lens element is f2, and they satisfy the relation: 1.4<f/f2<2.3.

15. The imaging lens system according to claim 14, wherein the focal length of the imaging lens system is f, the focal length of the second lens element is f2, and they satisfy the relation: 1.7<f/f2<2.3.

16. The imaging lens system according to claim 14, wherein an Abbe number of the first lens element is V1, an Abbe number of the second lens element is V2, and they satisfy the relation: 25.0<V2−V1<40.0.

17. The imaging lens system according to claim 16, wherein the first lens element has negative refractive power, and wherein the focal length of the imaging lens system is f, the focal length of the first lens element is f1, and they satisfy the relation: |f/f1|<0.40.

18. The imaging lens system according to claim 13, wherein the focal length of the imaging lens system is f, the focal length of the third lens element is f3, and they satisfy the relation: −0.50<f/f3<−0.10.

19. The imaging lens system according to claim 18, wherein a radius of curvature of the object-side surface of the third lens element is R5, the radius of curvature of the image-side surface of the third lens element is R6, and they satisfy the relation: 0.4<R5/R6<1.5.

20. The imaging lens system according to claim 13, wherein the focal length of the imaging lens system is f, a distance on the optical axis between the second and third lens elements is T23, and they satisfy the relation: 0.5<(T23/f)× 100<12.0.

21. An imaging lens system comprising, in order from an object side to an image side:
a first lens element having a convex object-side surface;
a second lens element with positive refractive power, the object-side and image-side surfaces thereof being aspheric;
a third lens element with negative refractive power, the object-side and image-side surfaces thereof being aspheric and at least one of the object-side and image-side surfaces having at least one inflection point; and
an aperture stop disposed in front of the first lens element;
wherein there are only three lens elements with refractive power; and wherein a focal length of the imaging lens system is f, a focal length of the first lens element is f1, a radius of curvature of the object-side surface of the second lens element is R3, a radius of curvature of the image-side surface of the second lens element is R4, a thickness on the optical axis of the second lens element is CT2, and they satisfy the relations: |f/f1|<0.58, |R3/R4|>0.94, 0.10 mm<CT2<1.00 mm.

22. The imaging lens system according to claim 21, wherein the focal length of the imaging lens system is f, a distance on the optical axis between the second and third lens elements is T23, and they satisfy the relation: 0.5<(T23/f)× 100<7.0.

23. The imaging lens system according to claim 21, wherein the thickness on the optical axis of the second lens element is CT2, and it satisfies the relation: 0.10 mm<CT2<0.75 mm.

24. The imaging lens system according to claim 21, wherein the focal length of the imaging lens system is f, a focal length of the third lens element is f3, a radius of curvature of the object-side surface of the third lens element is R5, a radius of curvature of the image-side surface of the third lens element is R6, and they satisfy the relations: −0.50<f/f3<−0.10, 0.5<R5/R6<1.5.

* * * * *